No. 787,568. PATENTED APR. 18, 1905.
J. FAWELL.
VALVE FOR BLOWING ENGINES.
APPLICATION FILED MAR. 18, 1903.
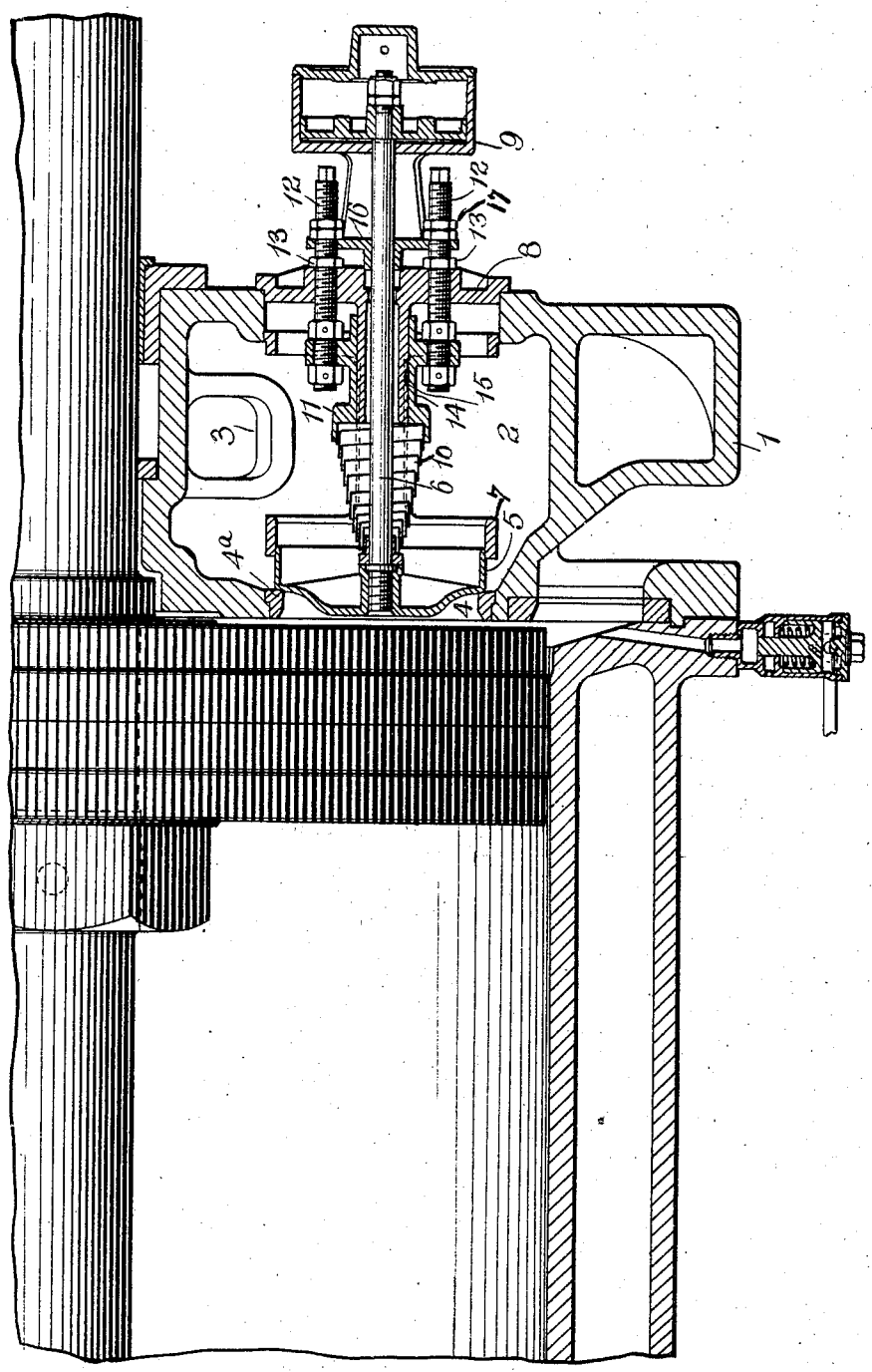
WITNESSES:
Herbert Bradley
F. E. Gaither
INVENTOR
Joseph Fawell
by Daniel B. Wolcott Att'y.

No. 787,568. Patented April 18, 1905.

UNITED STATES PATENT OFFICE.

JOSEPH FAWELL, OF PITTSBURG, PENNSYLVANIA.

VALVE FOR BLOWING-ENGINES.

SPECIFICATION forming part of Letters Patent No. 787,568, dated April 18, 1905.

Application filed March 18, 1903. Serial No. 148,373.

*To all whom it may concern:*

Be it known that I, JOSEPH FAWELL, a citizen of the United States, residing at Pittsburg, in the county of Allegheny and State of Pennsylvania, have invented or discovered certain new and useful Improvements in Valves for Blowing-Engines, of which improvements the following is a specification.

The invention described herein relates to certain improvements in outlet-valves for blowing-engines. It is the usual practice to employ valves controlling the outlets from the cylinder so constructed as to open when predetermined pressure has been attained in the cylinder, the valves being held to their seats by springs.

The present invention has for its object a construction permitting of the adjustment of the springs of the valve mechanisms without the removal of any of the parts.

The invention is hereinafter more fully described and claimed.

In the accompanying drawing, forming a part of this specification, is shown in sectional elevation a valve mechanism embodying my improvement.

In the practice of my invention the head 1 of the blowing-cylinder is provided with a chamber 2, having an outlet-port 3 and an inlet-port 4. This port is provided with a seat 4ª for the valve 5, secured to the stem 6 and guided in its movements by the frame 7. The stem 6 extends up through the cover 8, closing the opening through which the valve mechanism is placed in position, and is connected to the piston 9 of a dash-pot, whereby the closing movement of the valve is regulated. The valve is yieldingly held to its seat by a spring 10, preferably of the helical type. This spring bears at one end against a shoulder on the stem and at the other end against a head 11, adjustable by suitable means extending outside of the cover 8. A suitable means for this purpose consists of the threaded rods 12, passing through threaded openings in the cover 8 and having a loose connection with the head 11. By rotating these rods the head may be shifted to change the tension of the spring. It is preferred to prevent accidental rotation of the rods by means of jam-nuts 13 or other suitable means. In order to prevent any oscillation of the head 11 and to relieve the rods 12 from lateral strains, the head 11 is provided with a sleeve 14, movably mounted on a tubular guide 15, projecting from the inner side of the cover 8.

As shown in the drawing, it is preferred to employ the threaded rods 12 for holding the gland 16 in position, the adjustment of the gland being effected by nuts 17 screwing on said rods.

I claim herein as my invention—

1. A blowing-engine having in combination a cylinder-head provided with a chamber having an inlet-port, a valve controlling the flow of air through said port and provided with a stem extending out of said chamber, a dash-pot having its movable member connected to said stem, a movable head, a spring interposed between the valve and head, and rods extending outside of said chamber for shifting said head, substantially as set forth.

2. A blowing-engine having in combination a cylinder-head provided with a chamber having an inlet-port, and an opening for the insertion of a valve mechanism, a cover for said opening, a valve controlling the flow of air through said port and provided with a stem extending out of said chamber, a dash-pot connected to said stem, a movable head, a spring interposed between the valve and head, and adjusting-rods extending from said head through the cover, substantially as set forth.

3. A blowing-engine having in combination a cylinder-head provided with a chamber having an inlet-port and an opening for the insertion of a valve mechanism, a cover for said opening, a valve controlling the inlet-port and provided with a stem extending through the cover, a gland surrounding the stem, a movable head, a spring interposed between the valve and head, threaded rods connected to said head and passing through the gland, and nuts for shifting the head and gland, substantially as set forth.

In testimony whereof I have hereunto set my hand.

JOSEPH FAWELL.

Witnesses:
W. H. McFADDEN,
F. E. GAITHER.